US011580219B2

(12) United States Patent
Schmugar et al.

(10) Patent No.: US 11,580,219 B2
(45) Date of Patent: Feb. 14, 2023

(54) SYSTEM AND METHOD FOR MALWARE SIGNATURE GENERATION

(71) Applicant: McAfee, LLC, Santa Clara, CA (US)

(72) Inventors: Craig Schmugar, Hillsboro, OR (US);
Zheng Zhang, Santa Clara, CA (US);
John Teddy, Santa Clara, CA (US);
Michael Hughes, San Francisco, CA (US)

(73) Assignee: McAfee, LLC, San Jose, CA (US)

( * ) Notice: Subject to any disclaimer, the term of this patent is extended or adjusted under 35 U.S.C. 154(b) by 86 days.

(21) Appl. No.: 15/880,323

(22) Filed: Jan. 25, 2018

(65) Prior Publication Data
US 2019/0228151 A1   Jul. 25, 2019

(51) Int. Cl.
*G06F 21/56*  (2013.01)
*H04L 9/40*   (2022.01)

(52) U.S. Cl.
CPC .......... *G06F 21/564* (2013.01); *H04L 63/145* (2013.01); *H04L 63/1416* (2013.01)

(58) Field of Classification Search
CPC ...... G06F 21/56; G06F 21/562; G06F 21/564; H04L 63/1416
See application file for complete search history.

(56) References Cited

U.S. PATENT DOCUMENTS 5,440,723 A *  8/1995  Arnold ................. G06F 21/564
                                                 714/2
6,016,546 A *  1/2000  Kephart ............... G06F 21/564
                                                 726/24
7,210,041 B1 *  4/2007  Gryaznov ............... G06F 21/56
                                                 713/188
7,454,418 B1 * 11/2008  Wang .................... G06F 21/564
7,540,025 B2 *  5/2009  Tzadikario .......... H04L 63/0227
                                                 726/22

(Continued)

FOREIGN PATENT DOCUMENTS

CN      111869176 A       10/2020
DE      102010008538       8/2011

(Continued)

OTHER PUBLICATIONS

International Search Report, "Written Opinion and International Search Report," issued in connection with application No. PCT/US2018/068058, dated Mar. 27, 2019, 16 pages.

(Continued)

*Primary Examiner* — Zachary A. Davis
(74) *Attorney, Agent, or Firm* — Hanley, Flight & Zimmerman, LLC

(57) ABSTRACT

A technique for detecting malware involves loading known malware information, finding a string in the known malware information, saving the string in a first database, identifying a first contiguous string block from the known malware information, assigning a confidence indicator to the first contiguous string block, attempting to find the first contiguous string block in a second database containing one or more contiguous string blocks extracted from known malware, and responsive to a determination the first contiguous string block meets a predetermined threshold of similarity with a second contiguous string block contained in the second database, labelling the first contiguous string block.

20 Claims, 12 Drawing Sheets

(56) References Cited

U.S. PATENT DOCUMENTS

| | | | |
|---|---|---|---|
| 7,555,777 B2* | 6/2009 | Swimmer | G06F 21/552 |
| | | | 726/23 |
| 7,712,132 B1* | 5/2010 | Ogilvie | H04L 63/1408 |
| | | | 726/22 |
| 8,239,687 B2* | 8/2012 | Stolfo | G06F 21/552 |
| | | | 713/188 |
| 8,375,450 B1* | 2/2013 | Oliver | G06F 21/564 |
| | | | 726/24 |
| 8,401,982 B1 | 3/2013 | Satish et al. | |
| 8,522,085 B2* | 8/2013 | Agrawal | G06F 11/0706 |
| | | | 714/47.1 |
| 8,601,064 B1* | 12/2013 | Liao | H04L 51/12 |
| | | | 709/206 |
| 9,021,590 B2* | 4/2015 | Herley | G06F 21/564 |
| | | | 726/24 |
| 9,197,665 B1 | 11/2015 | Cabot et al. | |
| 9,411,955 B2* | 8/2016 | Jakobsson | G06F 21/55 |
| 2007/0240222 A1* | 10/2007 | Tuvell | G06F 21/56 |
| | | | 726/24 |
| 2008/0127336 A1* | 5/2008 | Sun | G06F 21/566 |
| | | | 726/22 |
| 2011/0314545 A1 | 12/2011 | Michlin et al. | |
| 2012/0159625 A1* | 6/2012 | Jeong | G06F 21/562 |
| | | | 726/23 |
| 2014/0189864 A1 | 7/2014 | Wang et al. | |
| 2016/0180088 A1* | 6/2016 | Zhang | G06F 21/564 |
| | | | 726/23 |
| 2017/0372071 A1 | 12/2017 | Saxe | |
| 2018/0007070 A1* | 1/2018 | Kulkarni | H04L 63/1416 |
| 2018/0324198 A1* | 11/2018 | Borthakur | G06F 8/61 |

FOREIGN PATENT DOCUMENTS

| | | |
|---|---|---|
| EP | 3744060 A1 | 12/2020 |
| WO | 2019147384 A1 | 8/2019 |

OTHER PUBLICATIONS

The International Bureau of WIPO, "International Preliminary Reporton Patentability," issued in connection with application No. PCT/2018068058, dated on Jul. 28, 2020, 10 pages.

The China National Intellectual Property Administration (CNIPA), "Office Action", in connection with Chinese Patent Application No. 201880091168.4, dated Dec. 31, 2021, 14 pages.

European Patent Office, "Communication pursuant to Rules 161(1) and 162 EPC, Comments on the written opinion and amendment of the application", in connection with European Patent Application No. 18836798.1, dated Sep. 4, 2020, 3 pages.

European Patent Office, "Communication pursuant to Article 94(3) EPC", mailed in connection with European Patent Application No. 18836798.1-1213 dated Feb. 25, 2022, 8 pages.

National Intellectual Property Adminstration, P. R. China, "Notice of Decision of Granting Patent Right," issued in connection with Chinese Patent Application No. 201880091168 4, dated May 19, 2022, 7 pages.

* cited by examiner

-- Prior Art --

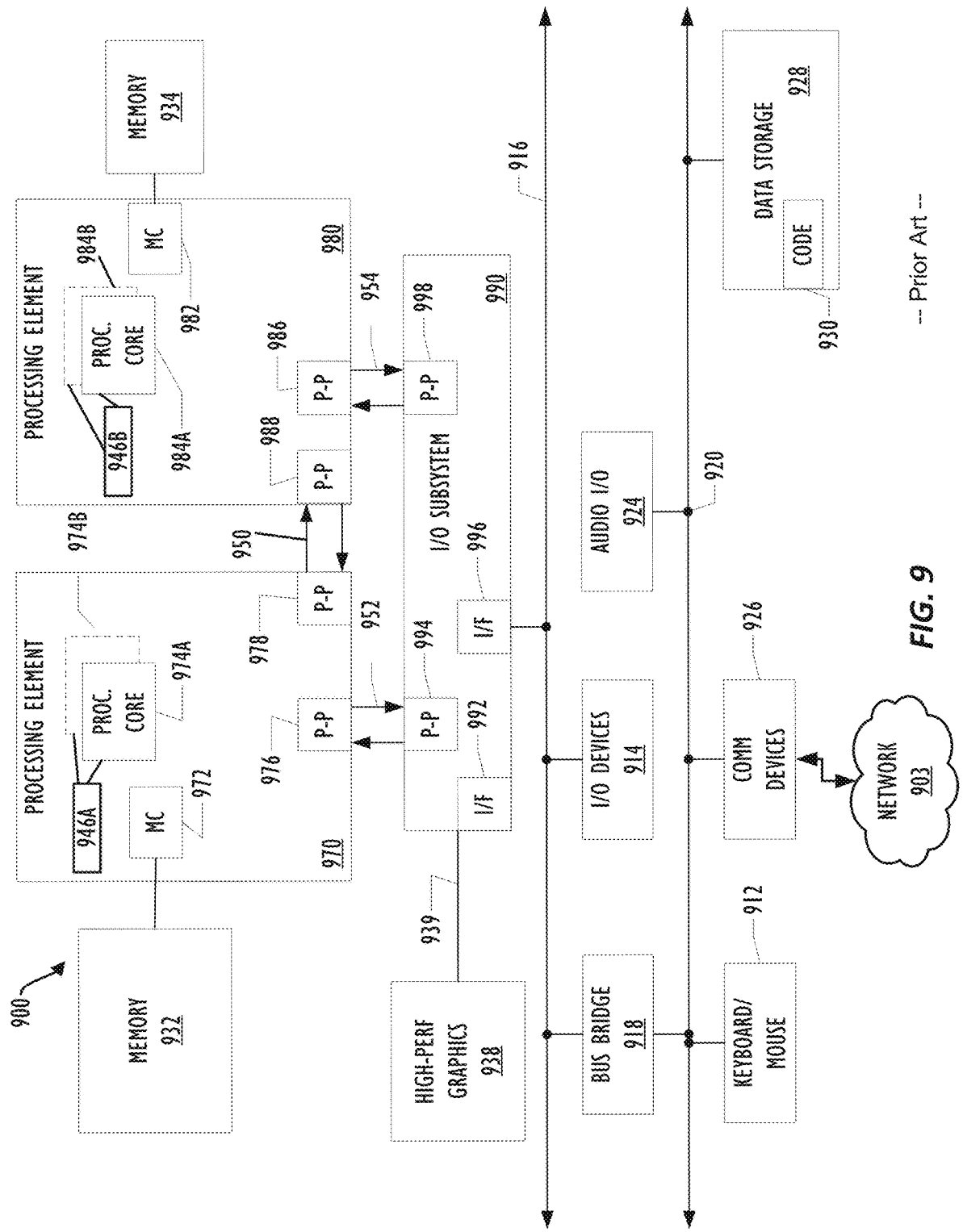
FIG. 9 -- Prior Art --

SYSTEM AND METHOD FOR MALWARE SIGNATURE GENERATION

TECHNICAL FIELD

Embodiments described herein generally relate to malware detection, and more specifically to detection of malware based on strings found in memory.

BACKGROUND ART

Malware evolves more quickly than a human user can author countermeasures. This makes malware detection difficult, as countermeasures are often obsolete before having identified very much malware. Numerous solutions to this problem exist, from automated hash and fuzzy hash identification signatures to file geometry fingerprints, but balancing proactive identification against false positives has been challenging. A better way to identify malware that is capable of detecting previously unknown malware without generating excessive false positives would be desirable.

In addition, malware obfuscation increases the time and resources necessary to detect malware. This slows memory analysis to forensic, rather than real-time, analysis. Further, static file scanners face a daunting task in attempting to keep up with the rate of obfuscator change. A better way to handle malware obfuscation for string extraction would be desirable.

BRIEF DESCRIPTION OF DRAWINGS

FIG. 9 is a diagram illustrating a computing device for use with techniques described herein according to one embodiment.

DESCRIPTION OF EMBODIMENTS

Figure 1:
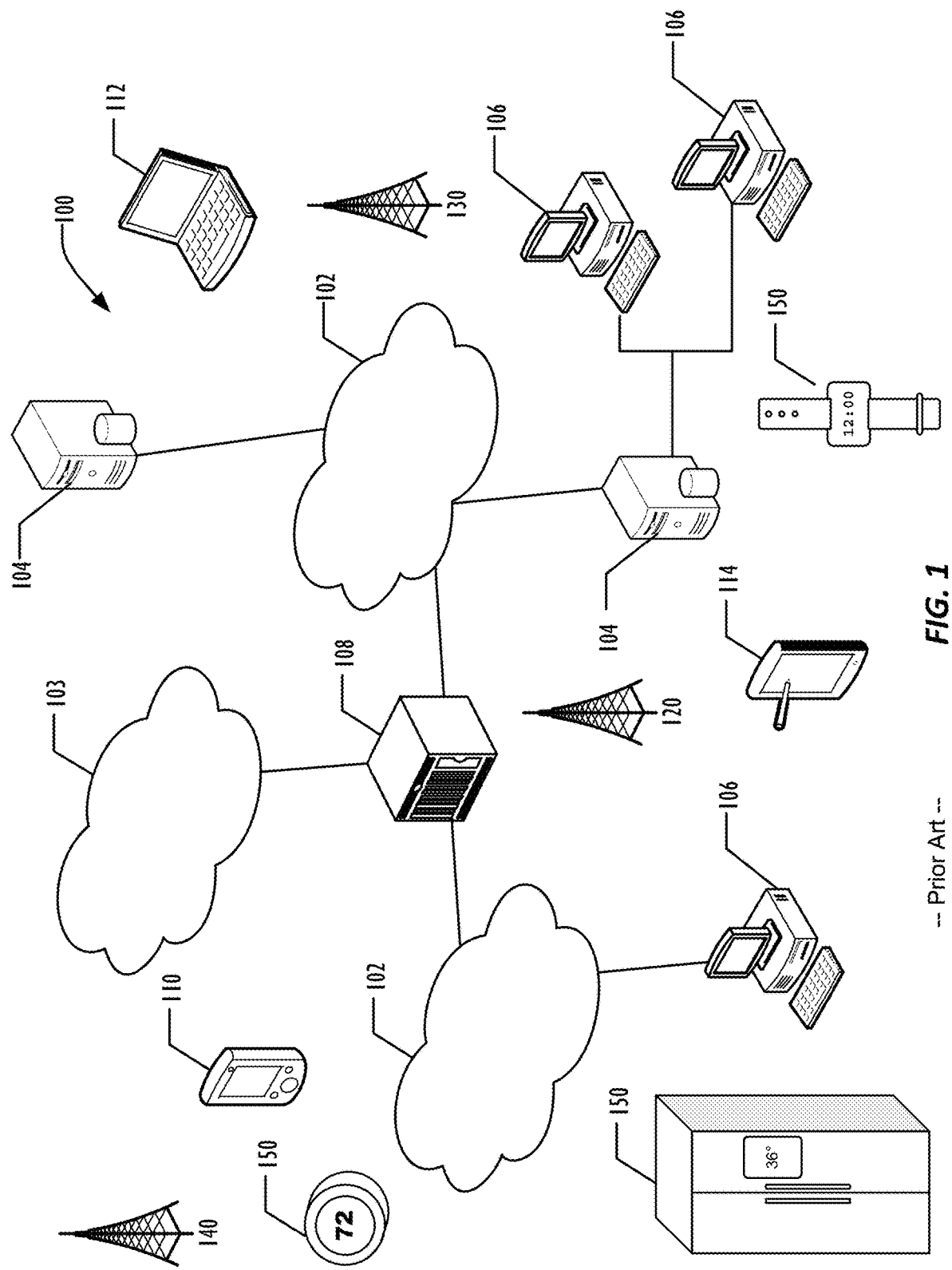
FIG. 1 is a diagram illustrating a network of programmable devices according to one or more embodiments.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "programmable device" can refer to a single programmable device or a plurality of programmable devices working together to perform the function described as being performed on or by the programmable device.

As used herein, the term "medium" refers to a single physical medium or a plurality of media that together store what is described as being stored on the medium.

As used herein, the term "network device" can refer to any programmable device that is capable of communicating with another programmable device across any type of network.

As used herein, the term "string" refers to a sequence of one or more immediately adjacent characters, typically, but not limited to, textual characters such as alphanumeric characters and other printable symbols.

As used herein, the term "delimiter" refers to an area that indicates a boundary between two adjacent strings. A delimiter may be an area at an end of a string, such as a null character or an area at the beginning of the string, such as a string length field. A delimited string may be delimited by delimiters at one or both ends of the string.

As used herein, the term "contiguous string block" refers to a sequence of one or more adjacent delimited strings. Two strings are considered to be adjacent if they are separated only by delimiters.

As used herein, the term "database" refers to any collection of data that can be searched to find an existing entry. Any desired form of database can be used, including simple text files or more structured forms of data storage, and no data structure or format is implied by the use of the term.

One or more embodiments provide a method for generating malware signatures for use in malware detection. Automated generation of malware signatures may allow malware to adapt to evolving malware in near real time. Similarly, wildcarding allows a single signature to describe an entire family of malware. These and other features allow malware detection to be proactive in detecting new variants of malware while A) maintaining relatively few signatures compared to the number of malware variants identified and B) not being prohibitively false positive prone.

In one embodiment, known malware may be loaded into memory. The malware may then be searched for strings, which are saved in an individual string database. In addition to the individual strings, other associated information may be stored in the individual string database, such as information about the location of the string, and information indicating how often the string is found, such as a count indicating how many malware samples include the string. Other information about the string may be included as desired.

Contiguous string blocks in the known malware may then be identified. A ranking score may be assigned to the contiguous string blocks. In some embodiments, the ranking score may be based on information stored in the individual string database about each string in the contiguous string block. For example, in one embodiment in which the individual string database stores sample counts for each individual string, the ranking score may be the sum of the sample counts for each component string in the contiguous string block. Other factors may be used as desired, including, for example, proximity of the contiguous string block to other contiguous string blocks.

Each of the contiguous string blocks found in the malware sample is then compared against the database of contiguous string blocks. In one embodiment, the database of contiguous string blocks is distinct from the database of individual strings; in other embodiments, the two databases may be the same database. In one embodiment, the contiguous string blocks found in the malware sample may be ranked by the ranking score and the ranking used for ordering the comparison of the contiguous string blocks against the database of contiguous string blocks.

If the contiguous string block is found to be similar to a database entry labelled as "clean" (indicating the contiguous string block is not a good indicator of malware), the current contiguous string block may be ignored and the next contiguous string block compared. A contiguous string block in the database may be labelled as "clean" using any desired technique. In some embodiments, instead of labelling entries as "clean," they may be labelled as "not clean" and an entry is clean if not so labelled. In such an embodiment, a contiguous string block that is similar to a database entry is ignored unless the database entry is labelled "not clean."

If the contiguous string block exactly matches an existing non-clean entry, then the database entry may be updated to note the contiguous string block has been found in another sample. If the contiguous string block is not similar to an existing database entry, the contiguous string block may be added to the database.

If the contiguous string block is similar but not identical to an existing non-clean entry, the contiguous string block and the existing non-clean entry may be merged using wildcarding techniques. One or more characters may be replaced with a special wildcard character not otherwise found in strings, indicating that this character in the string matches any character when comparing strings. In one embodiment, the wildcard character may be the "?" character, but any character may be used. Wildcarding techniques are known in the art and any technique for determining what character or characters to replace with wildcard characters may be used.

The wildcarded entry in the contiguous string block database may then be used to create a signature for a malware family. This recognizes that malware developers may make minor changes in the malware to try to decrease the recognizability of the malware. The wildcarded contiguous string block may then be added to the contiguous string block database, labelled by a block identifier. In some embodiments, the block identifier is an auto-incrementing unique integer. In some embodiments, multiple wildcarded contiguous string blocks may be generated because the same set of component strings may be found in different orders. The multiple wildcarded entries may together form the signature for the family. In some embodiments, if multiple wildcarded entries form the signature, a most commonly used subset of the wildcarded entries may be used to form the signature, omitting less commonly used subsets.

The block identifier, wildcarded entry, and a block order together form a signature for a malware family. The block order refers to the sequence position of a contiguous string block in a signature made up of multiple contiguous string blocks. In some embodiments, the block order may influence how much confidence should be placed in the signature. In some embodiments, a confidence indicator may be assigned to the signature. In one embodiment, the confidence indicator may be based at least in part on the number of wildcard characters found in the signature, with more wildcard characters generally indicating less confidence than fewer wildcard characters. In another embodiment, in addition to or instead of using the number of wildcard characters, the confidence indicator may be based at least in part on the number of strings that are components of the contiguous string block. In a further embodiment, in addition to or instead of using the number of wildcard characters and the number of strings that are components of the contiguous string block, the confidence indicator may be based at least in part on the block order.

The foregoing steps may generally be performed on a backend server. After generating the signatures, in some embodiments, a learning mode may be performed to help eliminate false positives. In this learning mode, the signatures may be used to examine known non-malware processes or applications of the client system. If the signature is found in a known non-malware process or application, the signature is likely to generate false positive indications of malware. Therefore, the detection of the corresponding contiguous string block in the non-malware process or application may cause an indication to update the contiguous string block database, labelling the corresponding contiguous string block as "clean." While this may cause false negatives, the elimination of false positives by this technique is considered preferable by such an embodiment.

After performing the above false positive elimination training, the signatures may be used for malware detection. This may be performed on the client or on backend server, as desired. If a signature of a non-clean block in the contiguous string block database is found in memory during malware detection, the confidence indication may be used to balance risk. For example, a predetermined confidence threshold may be used so that matches with a confidence level that does not meet the threshold criteria may not be reported as malware, while a confidence level that exceeds the threshold criteria may trigger an alert regarding the presence of possible malware. Any threshold criteria may be used, and any relationship with the threshold criteria may be used to determine whether to report or ignore a signature match.

In one or more embodiments, the method for generating malware signatures may be used to train a malware detection system on known malware, to update an already implemented malware detection system with results from a client system's files, and to incorporate signatures of malware identified by other malware detection systems. Some embodiments may combine the method for generating malware signatures with a method for graphical processing unit (GPU) based memory scanning, to achieve more efficient and less processing intensive malware detection than the method for generating malware signatures alone.

Referring to FIG. 1, an example infrastructure 100 in which embodiments may be implemented is illustrated schematically. Infrastructure 100 contains computer networks 102. Computer networks 102 may include many different types of computer networks available today, such as the Internet, a corporate network, a Local Area Network (LAN), or a personal network, such as those over a Bluetooth connection. Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Each of the networks 102 may contain a number of other devices typically referred to as Internet of Things devices (microcontrollers, embedded systems, industrial control computing modules, thermostat, refrigerator, etc.) 150. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, it is most commonly implemented in a firewall or intrusion protection system in a gateway or router.

Figure 2:
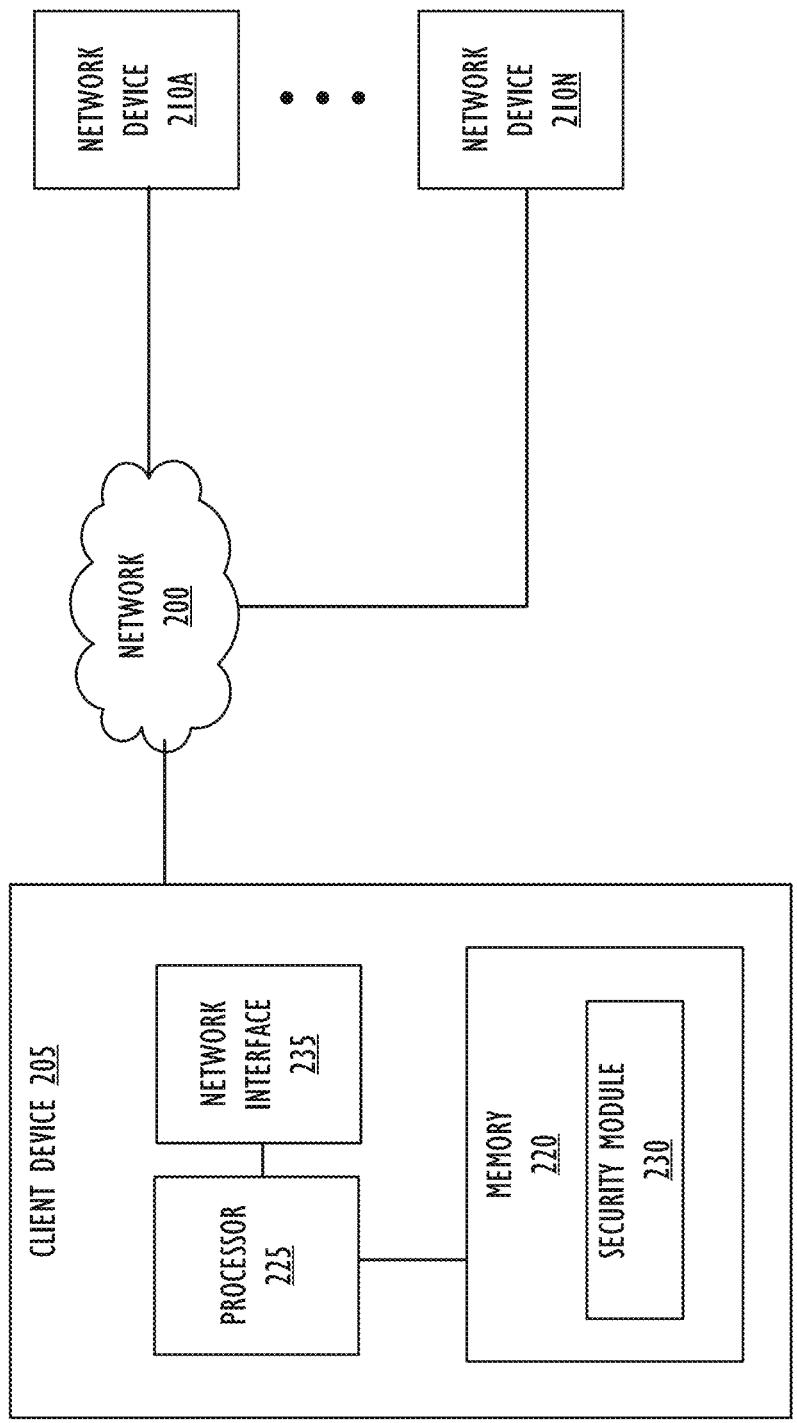
FIG. 2 is a diagram illustrating an example system for utilizing a system for malware signature generation, according to one or more embodiments.

FIG. 2 is a diagram illustrating an example system for generating malware signatures, according to one or more embodiments. FIG. 2 includes a client device 205, and network devices 210A through 210N. Each of client device 205, and network devices 210A through 210N may be connected across network 200. Client device 205 may include, for example, a memory 220 and processor 225, along with a network interface 235 utilized to connect to network devices 210A through 210N over a network 200. Memory 220 may include a number of software or firmware modules executable by processor 225. In one or more embodiments, memory 220 may include a security module 230. Security module 230 may be utilized to perform security functions for data across the network.

Additionally, security module 230 may manage the processing of computer code by processor 225. In one or more embodiments, security module 230 may generate malware signatures. For example, security module 230 may generate malware signatures by identifying contiguous string blocks in known malware and assigning a confidence indicator to represent the likelihood the contiguous string block describes malware. According to one or more embodiments, security module 230 may wildcard differences between a first contiguous string block identified in the known malware and a second contiguous string block contained in a database of contiguous string blocks, modifying the existing database entry and adjusting a confidence indicator associated with the second contiguous string block in the contiguous string block database.

Figure 3:
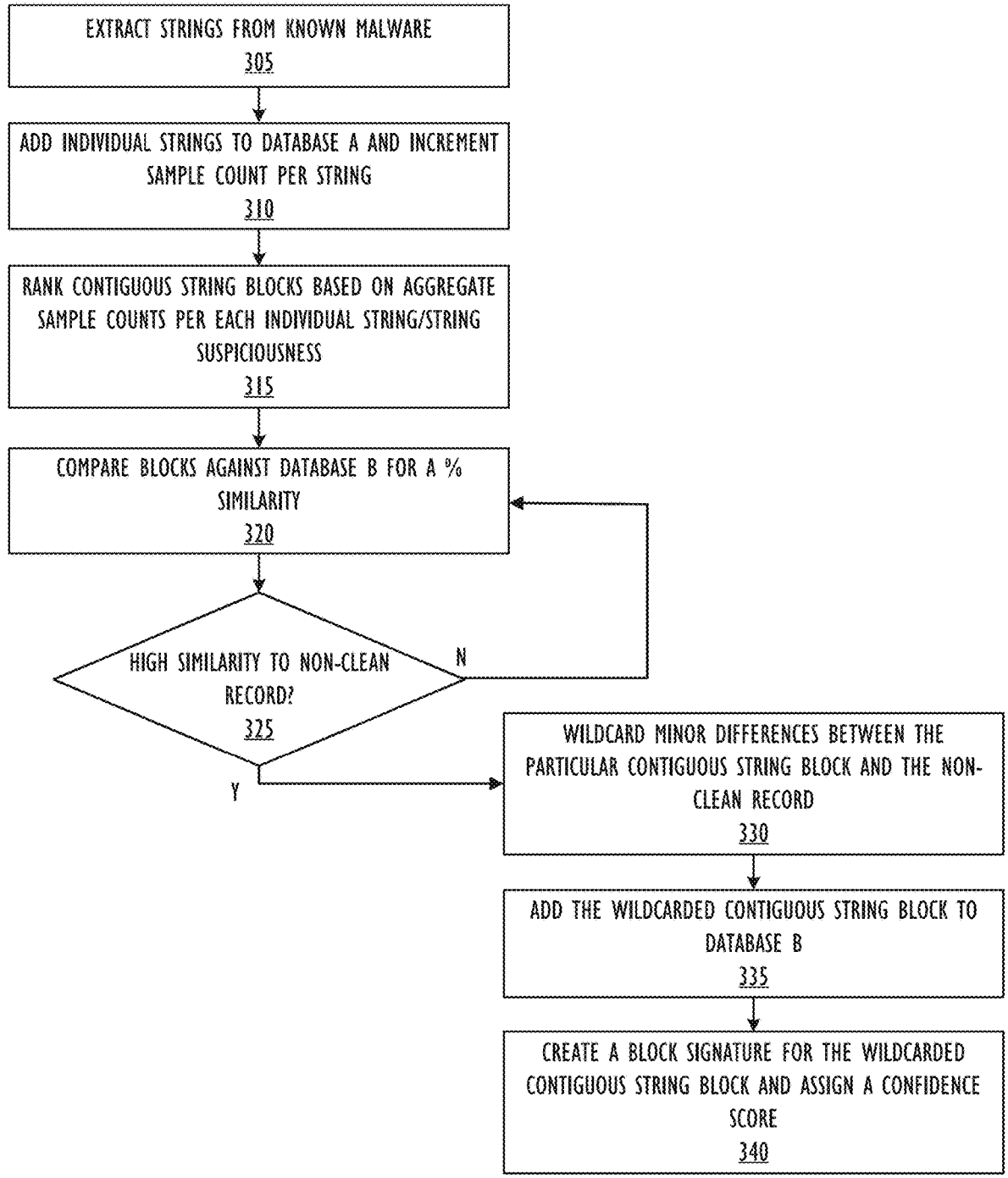
FIG. 3 is a flowchart illustrating a method for generating malware signatures, according to one or more embodiments.

FIG. 3 is a flowchart illustrating a method of generating malware signatures for use in malware detection. The method begins at 305 and strings are extracted from known malware. The known malware may be from memory, such as memory 220, or dumped from active memory, excluding trusted libraries and the like. Next, at 310, the individual strings are added to a database, here labelled database A, containing unique strings and the number of unique samples containing each unique string. The sample count per string is also incremented in 310. At 315, contiguous string blocks are ranked based on aggregate sample counts for each component string in the contiguous string block. Contiguous string blocks are identified as strings separated from each other by a delimiter. For example, in the programming language C, the delimiter may be a null character. According to one or more embodiments, contiguous string block rankings may also be based on other factors. For example, the rankings may also consider the location of each component string and proximity to other strings; the percent matching to other known malware, indicating a relationship; a string specific value indicating likelihood of being malware; and the like.

Next, at 320, the contiguous string blocks are compared against contiguous string blocks in a second database for a percent similarity. The second database, here labelled database B, contains contiguous string blocks extracted from known malware. If, at 325, a determination is made that there is a low similarity between a first contiguous string block from known malware and the contiguous string blocks contained in database B, the next contiguous string block in database A is compared against the contiguous string blocks contained in database B. If, at 325, a determination is made that there is a high similarity between the first contiguous string block and a particular contiguous string block from database B, the flow chart continues to 330. At 330, minor differences between the first contiguous string block and the particular contiguous string block from database B are wildcarded. In one or more embodiments, the most frequently occurring wildcarded contiguous string block may be used as a signature to identify the malware family.

At 335, the wildcarded contiguous string block is added to database B and used in future iterations of the method. In one or more embodiments, a block identification associated with the wildcarded contiguous string block may be fetched from database B. Next, at 340, a block signature for the wildcarded contiguous string block may be created and a confidence score assigned. In one or more embodiments, the block signature may be based at least in part on the block identification, order of component strings within the block, and the like. In one or more embodiments, the confidence indicator may be based at least in part on the number of wildcards in the block, the number of malicious samples matched, the number of non-malware samples matched, the prevalence of the block, how long it has been used in the field to search for malware, and the like.

Figure 4:
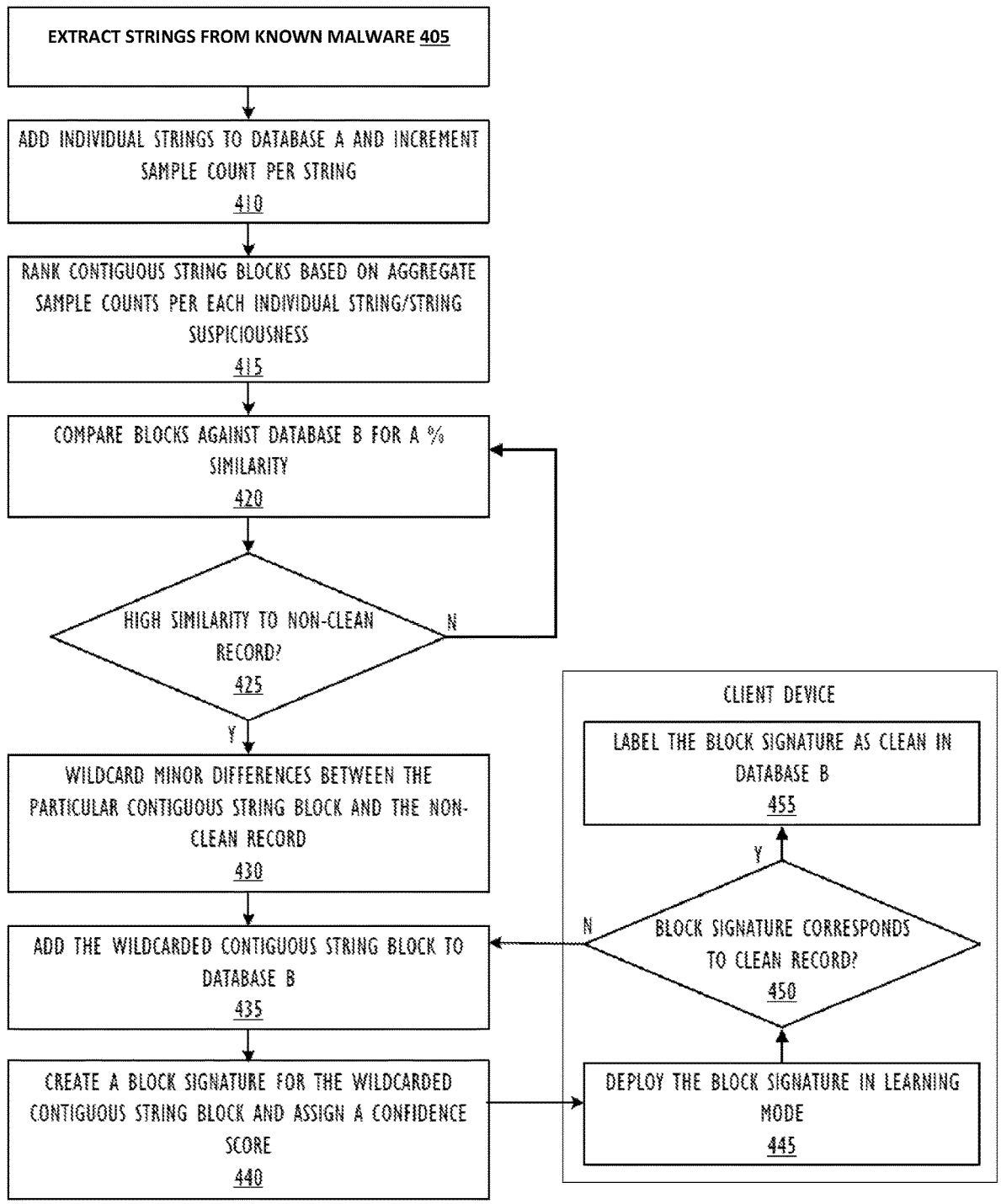
FIG. 4 is a flowchart illustrating a method for generating malware signatures and confirming the signatures on a client's device, according to one or more embodiments.

FIG. 4 is a flowchart illustrating another method of generating malware signatures for use in malware detection. Steps 405-440 mirror steps 305-340 in FIG. 3. However, the method shown in FIG. 4 continues at 445, and the block signature for the wildcarded contiguous string block is deployed to a client system, such as client device 205, in learning mode. In learning mode, the block signature will not be used to flag malware; only to update database B and remove false positives. If at 450, a determination is made the block signature corresponds to a clean record on the client device, the block signature will be labelled as clean in database B at 455. If, at 450, a determination is made the block signature does not correspond to a clean record on the client device, the block signature will be returned to security module 230 which will update the wildcarded contiguous string block's assigned confidence score at 435-440 and continue to block 445.

Figure 5:
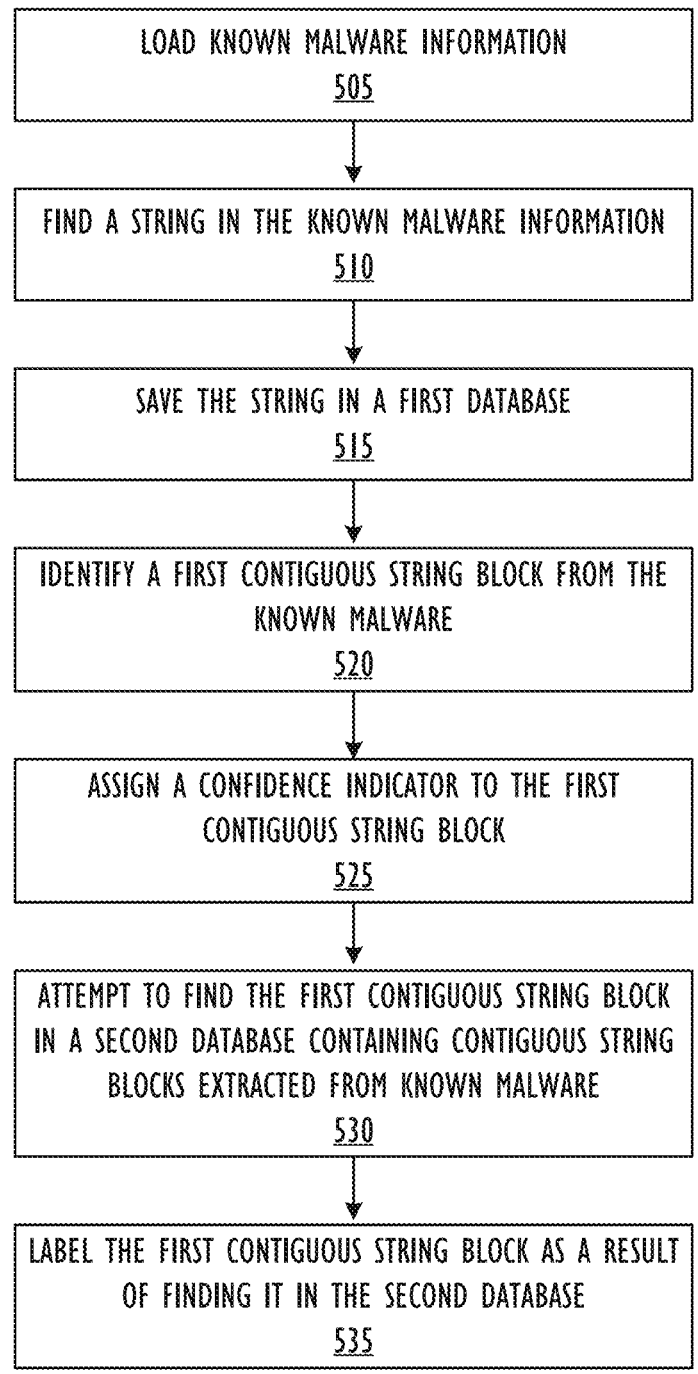
FIG. 5 is a flowchart illustrating a method for generating malware signatures based on contiguous string blocks, according to one or more embodiments.

FIG. 5 is a flowchart illustrating a method for generating malware signatures based on contiguous string blocks, according to one or more embodiments. The flow chart begins at 505, where known malware information is loaded into memory, such as memory 220. At 510, a string is found in the known malware information. Continuing to 515, the string is saved in a first database. Next, at 520, a first contiguous string block is identified from known malware information. As discussed previously, contiguous string blocks are identified as two or more strings separated from each other by a delimiter. For example, in the programming language C, the delimiter may be a null character.

At 525, a confidence indicator is assigned to the first contiguous string block. As discussed previously, in one or more embodiments the confidence indicator may be based at least in part on wildcards in the block, the number of malicious samples matched, the number of non-malware samples matched, the prevalence of the contiguous string block, how long it has been used in the field to search for malware, and the like. At 530, the first contiguous string block is looked for in a second database containing contiguous string blocks extracted from known malware. If the first contiguous string block is found in the second database, the first contiguous string block may be labelled at 535. For example, in one embodiment, if the corresponding contiguous string block contained in the second database is labelled "clean" and thus not indicative of malware, the first contiguous string block is labelled "clean." In this example, contiguous string blocks not labelled as "clean" may be understood to be "not clean" and indicative of malware. Similarly, in another embodiment, if the corresponding contiguous string block contained in the second database is labelled as "not clean" and indicative of malware, the first contiguous string block is labelled "not clean." In this further example, contiguous string blocks not labelled as "not clean" may be understood to be "clean" and not indicative of malware. In other embodiments, a combination of "clean" and "not clean" labels may be used. In still other embodiments, an alternate labelling system may be used. Any desired technique for indicating "clean" (or "not clean") can be used.

Although the flow chart ends at 535, in one or more embodiments the first contiguous string block is deployed in a client system in a learning mode. In learning mode, the first contiguous string block will not be used to flag malware; only to update the second database and remove false positives. If a determination is made the first contiguous string block corresponds to a clean record in the client system, the first contiguous string block will be labelled as "clean" in the second database. If a determination is made the first contiguous string block does not correspond to a clean record on the client device, the first contiguous string block will be returned to security module 230 which will update the first contiguous string block's assigned confidence score.

Figure 6A:
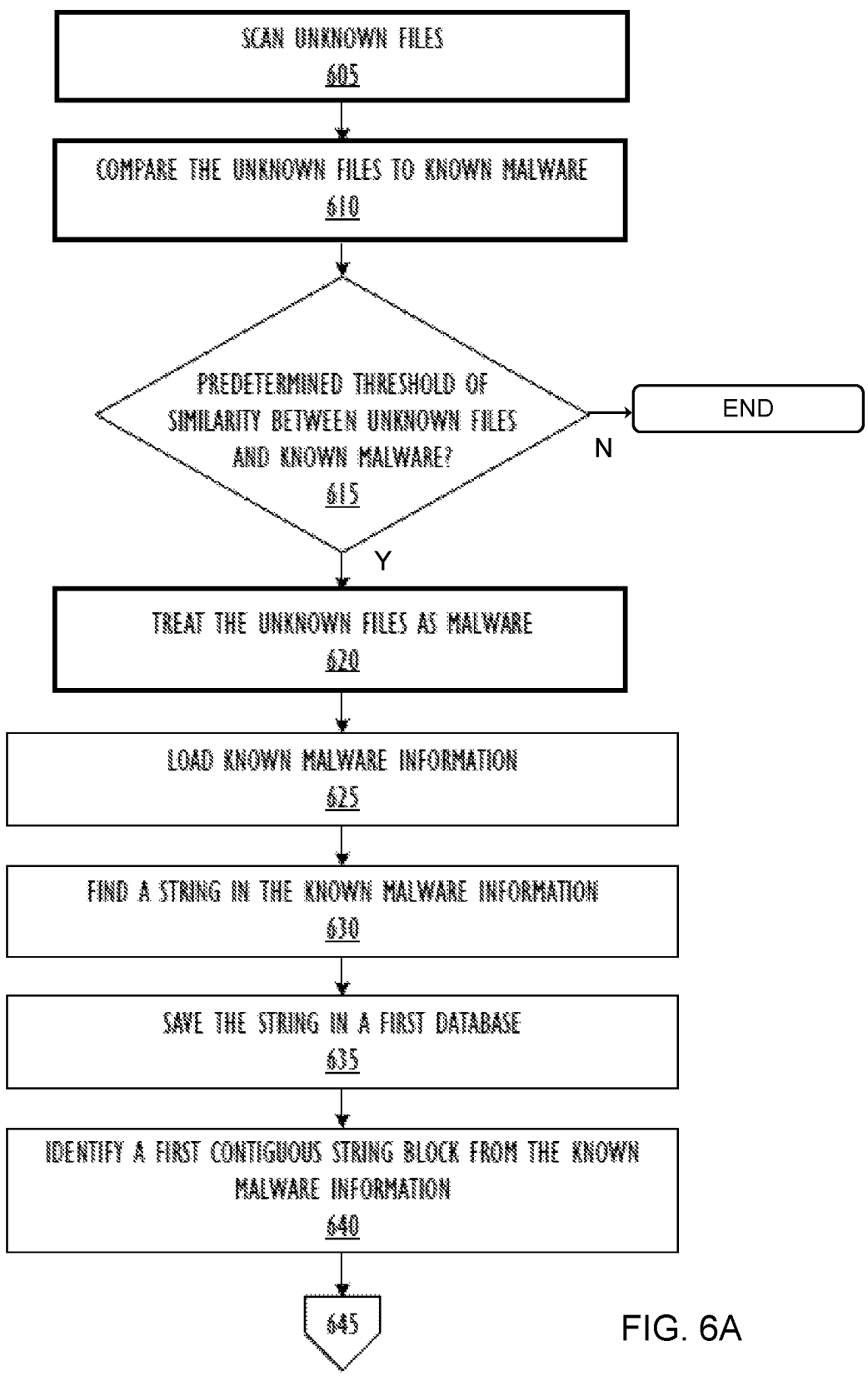
FIGS. 6A and 6B are a flowchart illustrating another method for generating malware signatures based on contiguous string blocks, according to one or more embodiments.
Figure 6B:
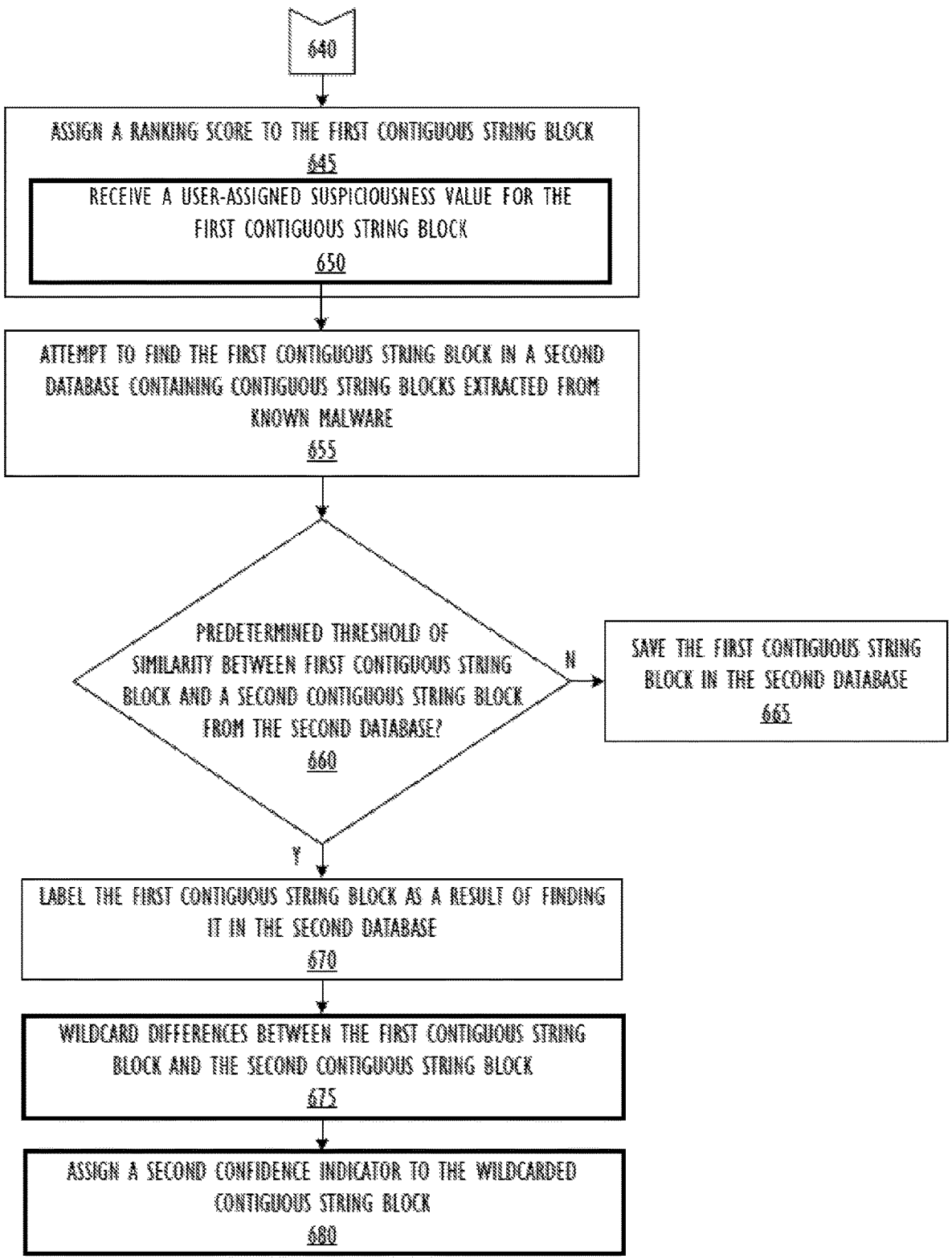

FIGS. 6A and 6B are a flowchart illustrating another method for generating malware signatures based on contiguous string blocks, according to one or more embodiments. The flow chart begins at 605, where security module 230 scans unknown files. Next, at 610, the unknown files are compared to known malware. If, at 615, a determination is made the unknown files meet a predetermined threshold of similarity with the known malware, the flowchart continues to 620, where the unknown files are treated as malware and loaded as known malware information in 625. At 630, a string is found in the malware in the memory. In some embodiments, the string may be provided by a client system. For example, the client system may provide one or more strings found by another malware detector for malware signature generation. Continuing to 635, the string is saved in a first database. Next, at 640, a first contiguous string block is identified from the first database. As discussed previously, contiguous string blocks are identified as strings separated from each other by a delimiter.

At 645, a ranking score is assigned to the first contiguous string block. In some embodiments, step 645 may optionally further comprise step 650. At 650, security module 230 receives a user-assigned suspiciousness value for the first contiguous string block to be considered in assigning the ranking score. As discussed previously, in one or more embodiments the ranking score may further be based at least in part on wildcards in the block, the number of malicious samples matched, the number of clean samples matched, the prevalence of the first contiguous string block, how long it has been used in the field to search for malware, and the like. At 655, security module 230 attempts to find the first contiguous string block in a second database containing contiguous string blocks extracted from known malware. In one or more embodiments, the contiguous string blocks in the second database may be ranked for use in ordering the contiguous string blocks within the second database. For example, a highly ranked contiguous string block may be compared with the first contiguous string block before a lowly ranked contiguous string block. The contiguous string block ranking may be based at least in part on the confidence indicator associated with each contiguous string block in the second database, the number of times each component string in each contiguous string block appears, a location of each component string in memory, the proximity of each component string to other component strings, and a string-specific value for each component string. If, at 660, it is determined the first contiguous string block does not meet a predetermined threshold of similarity with the contiguous string blocks in the second database, the first contiguous string block may be saved in the second database at 665. If, at 660, it is determined the first contiguous string block meets a predetermined threshold of similarity with a second contiguous string block from the second database, the flowchart continues to 670.

At 670, the first contiguous string block is labelled as a result of finding it in the second database. As discussed previously, in one example embodiment, if the corresponding contiguous string block contained in the second database is labelled "clean" and thus not indicative of malware, the first contiguous string block is labelled "clean." In this example, contiguous string blocks not labelled as "clean" may be understood to be "not clean" and indicative of malware. Similarly, in another embodiment, if the corresponding contiguous string block contained in the second database is labelled as "not clean" and indicative of malware, the first contiguous string block is labelled "not clean." In this further example, contiguous string blocks not labelled as "not clean" may be understood to be "clean" and not indicative of malware. In other embodiments, a combination of "clean" and "not clean" labels may be used. In still other embodiments, an alternate labelling system may be used.

After the first contiguous string block is labelled "clean" in 670, the flow chart continues at 675, where differences between the first contiguous string block and the second contiguous string blocks are wildcarded. As discussed previously, one or more characters may be replaced with a special wildcard character not otherwise found in strings, indicating that this character in the string matches any character when comparing strings. In one embodiment, the wildcard character may be the "?" character, but any character may be used. Wildcarding techniques are known in the art and any technique for determining what character or characters to replace with wildcard characters may be used. The flow chart ends at 680, where a second confidence indicator is assigned to the wildcarded contiguous string block. The second confidence indicator may be based in part on the first confidence indicator, the number of wildcards in the wildcarded contiguous string block, the number of samples matched, the prevalence of the wildcarded contiguous string block in the known malware, how long the contiguous string block has been used to detect malware, and the like.

Although the flow chart ends at 680, in one or more embodiments the wildcarded contiguous string block is deployed in a client system in a learning mode. In learning mode, the wildcarded contiguous string block will not be used to flag malware; only to update the second database and remove false positives. If a determination is made the wildcarded contiguous string block corresponds to a clean record in the client system, the wildcarded contiguous block will be labelled as "clean" in the second database. If a determination is made the wildcarded contiguous string block does not correspond to a clean record on the client device, the wildcarded contiguous string block will be returned to security module 230 which will update the wildcarded contiguous string block's assigned confidence indicator.

Figure 7:
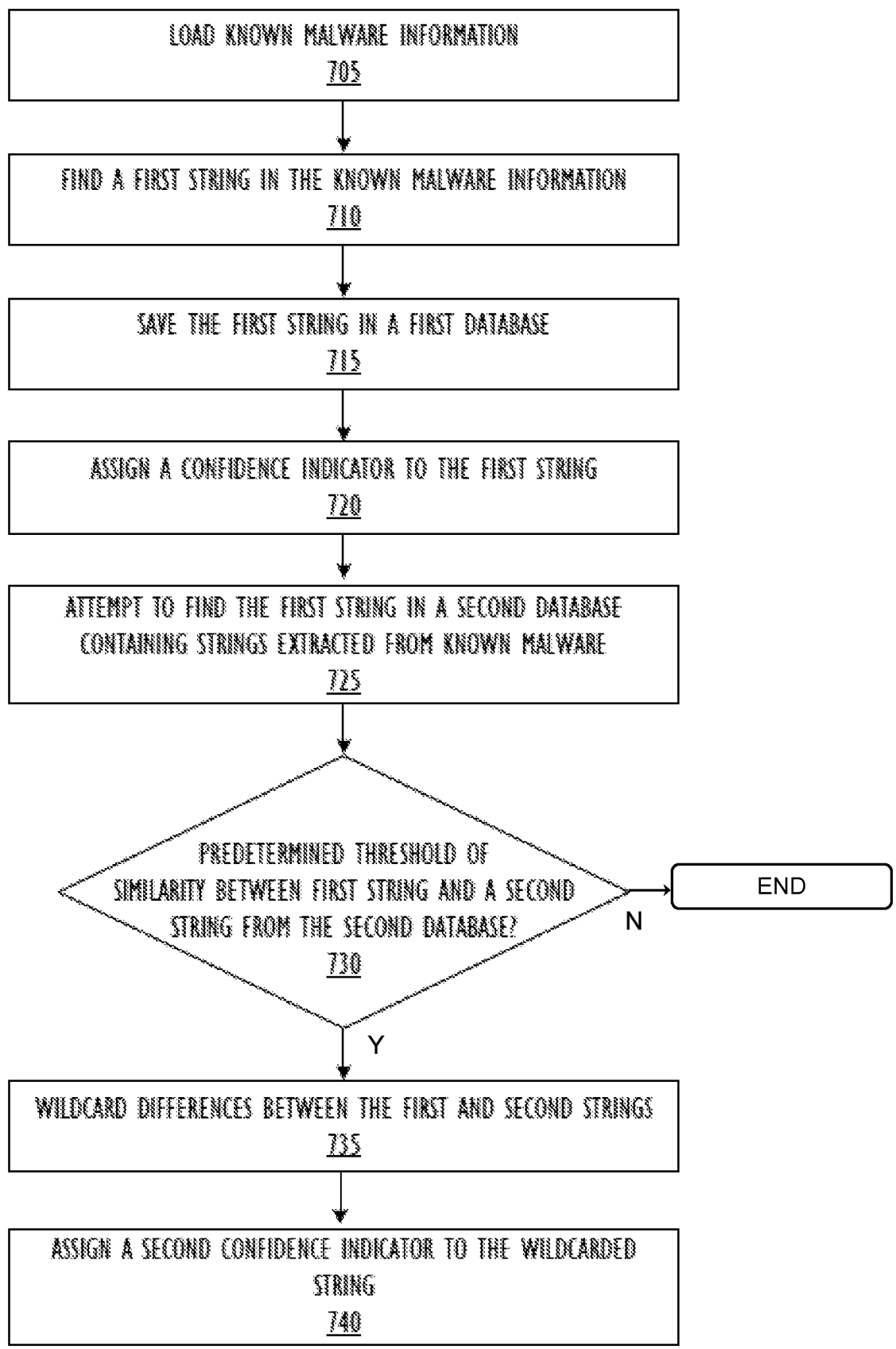
FIG. 7 is a flowchart illustrating a method for generating malware signatures based on wildcarded strings, according to one or more embodiments.

Referring now to FIG. 7, a flowchart illustrates a method for generating malware signatures based on wildcarded strings, according to one or more embodiments. The flow chart begins at 705, where known malware information is loaded into memory, such as memory 220. At 710, a first string is found in the known malware information. Continuing to 715, the first string is saved in a first database. Next, at 720, a confidence indicator is assigned to the first string. As discussed previously, in one or more embodiments the confidence indicator may be based at least in part on the number of malicious samples matched, the number of clean samples matched, the prevalence of the string, how long it has been used in the field to search for malware, and the like. At 725, the first string is attempted to be found in a second database containing strings extracted from known malware. If, at 730, it is determined that the first string meets a predetermined threshold of similarity to a second string from the second database, the flow chart continues at 735, and differences between the first string and the second string may be wildcarded. The flow chart ends at 740, where a second confidence indicator is assigned to the wildcarded string.

Although the flow chart ends at 740, in one or more embodiments the wildcarded string is deployed in a client system in a learning mode. In learning mode, the wildcarded string will not be used to flag malware; only to update the second database and remove false positives. If a determination is made the wildcarded string corresponds to a clean record in the client system, the wildcarded string will be labelled as "clean" in the second database. If a determination is made the wildcarded string does not correspond to a clean record on the client device, the wildcarded string will be returned to security module 230 which will update the wildcarded string's assigned confidence indicator.

Figure 8A:
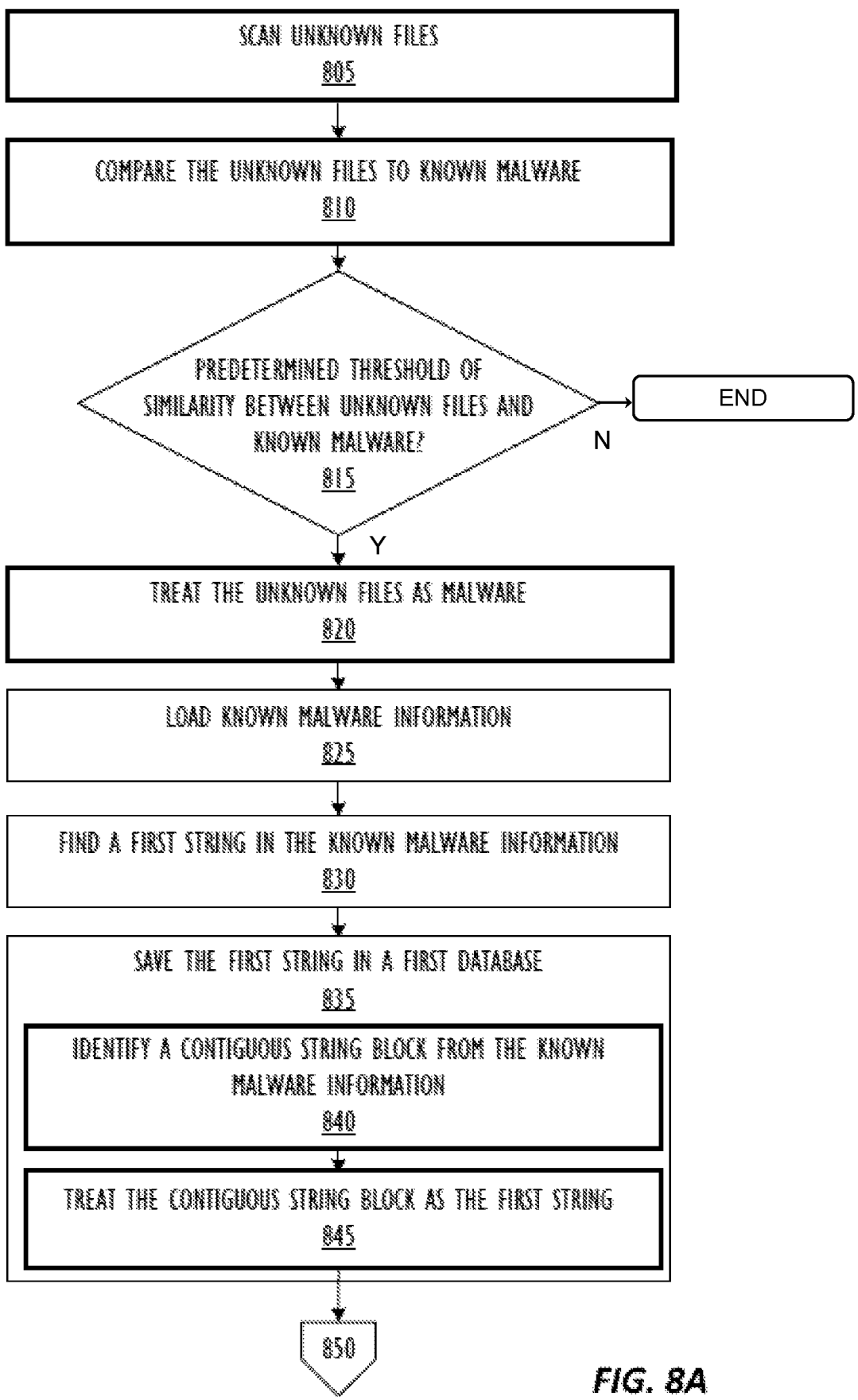
FIGS. 8A and 8B are a flowchart illustrating another method for generating malware signatures based on wildcarded strings, according to one or more embodiments.
Figure 8B:
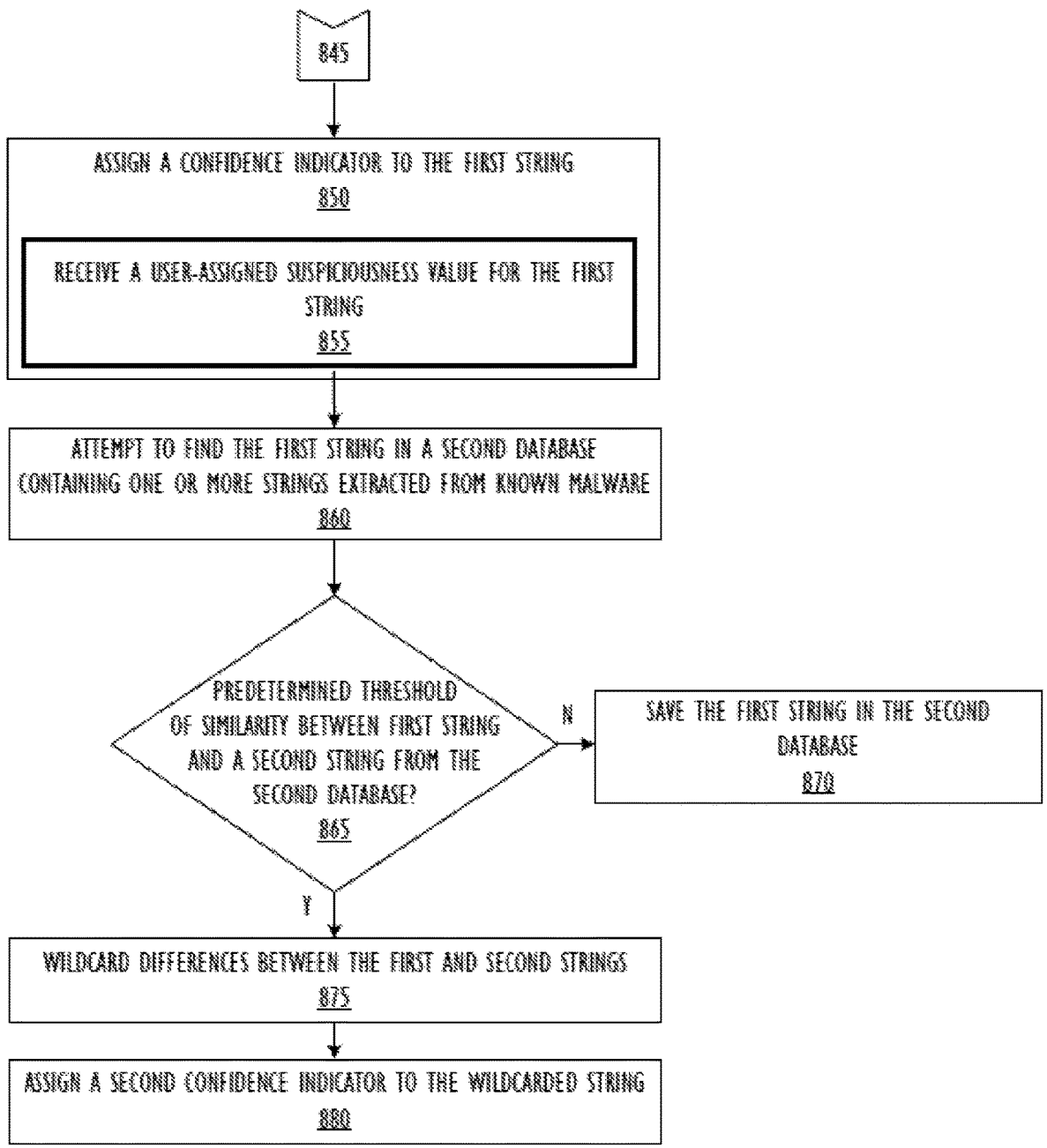

FIGS. 8A and 8B are a flowchart illustrating another method for generating malware signatures based on wildcarded strings, according to one or more embodiments. The flow chart begins at 805, where security module 230 scans unknown files. Next, at 810, the unknown files are compared to known malware. If, at 815, a determination is made the unknown files meet a predetermined threshold of similarity with the known malware, the flowchart continues to 820, where the unknown files are treated as malware and loaded as known malware information in 825. At 830, a first string is found in the known malware information. In some embodiments, the first string may be provided by a client system. For example, the client system may provide one or more strings found by another malware detector for malware signature generation. Continuing to 835, the first string is saved in a first database. Step 835 may optionally comprise steps 840 and 845. At 840, a first contiguous string block is identified from the known malware. As discussed previously, contiguous string blocks are identified as strings separated from each other by a delimiter. For example, in the programming language C, the delimiter may be a null character. At 845, the contiguous string block is treated as the first string throughout the rest of the method.

At 850, a confidence indicator is assigned to the first string. In some embodiments, step 850 may optionally further comprise step 855. At 855, security module 230 receives a user-assigned suspiciousness value for the first string to be considered in assigning the confidence indicator. As discussed previously, in one or more embodiments the confidence indicator may further be based at least in part on the number of malicious samples matched, the number of clean samples matched, the prevalence of the first string, how long it has been used in the field to search for malware, and the like. At 860, security module 230 attempts to find the first string in a second database containing strings extracted from known malware. In one or more embodiments, the strings in the second database may be ranked for use in ordering the strings within the second database. For example, a highly ranked string may be compared with the first string before a lowly ranked string. The string ranking may be based at least in part on the confidence indicator associated with each string in the second database, the number of times each string appears, a location of each string in memory, the proximity of each string to other strings, and a string-specific value for each string. If, at 865, it is determined the first string does not meet a predetermined threshold of similarity with the strings in the second database, the first string may be saved in the second database at 870. If, at 865, it is determined the first string meets a predetermined threshold of similarity with a second string from the second database, the flowchart continues to 875.

At 875, differences between the first string and the second string from the second database are wildcarded. As discussed previously, one or more characters may be replaced with a special wildcard character not otherwise found in strings, indicating that this character in the string matches any character when comparing strings. In one embodiment, the wildcard character may be the "?" character, but any character may be used. Wildcarding techniques are known in the art and any technique for determining what character or characters to replace with wildcard characters may be used. The flow chart ends at 880, where a second confidence indicator is assigned to the wildcarded string. The second confidence indicator may be based in part on the first confidence indicator, the number of wildcards in the wildcarded string, the number of samples matched, the prevalence of the wildcarded string in the known malware, how long the wildcarded string has been used to detect malware, and the like.

Although the flow chart ends at 880, in one or more embodiments the wildcarded string is deployed in a client system in a learning mode. In learning mode, the wildcarded string will not be used to flag malware; only to update the second database and remove false positives. If a determination is made the wildcarded string corresponds to a clean record in the client system, the wildcarded string will be labelled as "clean" in the second database. If a determination is made the wildcarded string does not correspond to a clean record on the client device, the wildcarded string will be returned to security module 230 which will update the wildcarded string's assigned confidence indicator.

Referring now to FIG. 9, a block diagram illustrates a programmable device 900 that may be used within a network device, such as devices 205, in accordance with one or more embodiments. Devices 205 may not include all of the elements of FIG. 9. The programmable device 900 illustrated in FIG. 9 is a multiprocessor programmable device that includes a first processing element 970 and a second processing element 980. While two processing elements 970 and 980 are shown, an embodiment of programmable device 900 may also include only one such processing element.

Programmable device 900 is illustrated as a point-to-point interconnect system, in which the first processing element 970 and second processing element 980 are coupled via a point-to-point interconnect 950. Any or all of the interconnects illustrated in FIG. 9 may be implemented as a multi-drop bus rather than point-to-point interconnects.

As illustrated in FIG. 9, each of processing elements 970 and 980 may be multicore processors, including first and second processor cores (i.e., processor cores 974a and 974b and processor cores 984a and 984b). Such cores 974a, 974b, 984a, 984b may be configured to execute instruction code in a manner similar to that discussed above in connection with FIGS. 1-8. However, other embodiments may use processing elements that are single core processors as desired. In embodiments with multiple processing elements 970, 980, each processing element may be implemented with different numbers of cores as desired.

Each processing element 970, 980 may include at least one shared cache 946. The shared cache 946a, 946b may store data (e.g., instructions) that are utilized by one or more components of the processing element, such as the cores 974a, 974b and 984a, 984b, respectively. For example, the shared cache 946a, 946b may locally cache data stored in a memory 932, 934 for faster access by components of the processing elements 970, 980. In one or more embodiments, the shared cache 946a, 946b may include one or more mid-level caches, such as level 2 (L2), level 3 (L3), level 4 (L4), or other levels of cache, a last level cache (LLC), or combinations thereof.

While FIG. 9 illustrates a programmable device with two processing elements 970, 980 for clarity of the drawing, the scope of the present invention is not so limited and any number of processing elements may be present. Alternatively, one or more of processing elements 970, 980 may be an element other than a processor, such as a graphics processing unit (GPU), a digital signal processing (DSP) unit, a field programmable gate array, or any other programmable processing element. Processing element 980 may be heterogeneous or asymmetric to processing element 970. There may be a variety of differences between processing elements 970, 980 in terms of a spectrum of metrics of merit including architectural, micro-architectural, thermal, power consumption characteristics, and the like. These differences may effectively manifest themselves as asymmetry and heterogeneity amongst processing elements 970, 980. In some embodiments, the various processing elements 970, 980 may reside in the same die package.

First processing element 970 may further include memory controller logic (MC) 972 and point-to-point (P-P) interconnects 976 and 978. Similarly, second processing element 980 may include a MC 982 and P-P interconnects 986 and 988. As illustrated in FIG. 9, MCs 972 and 982 couple processing elements 970 and 980 to respective memories, namely a memory 932 and a memory 934, which may be portions of main memory locally attached to the respective processors. While MC logic 972 and 982 is illustrated as integrated into processing elements 970 and 980, in some embodiments the memory controller logic may be discrete logic outside processing elements 970, 980 rather than integrated therein.

Processing element 970 and processing element 980 may be coupled to an I/O subsystem 990 via respective P-P interconnects 976 and 986 through links 952 and 954. As illustrated in FIG. 9, I/O subsystem 990 includes P-P interconnects 994 and 998. Furthermore, I/O subsystem 990 includes an interface 992 to couple I/O subsystem 990 with a high performance graphics engine 938. In one embodiment, a bus (not shown) may be used to couple graphics engine 938 to I/O subsystem 990. Alternately, a point-to-point interconnect 939 may couple these components.

In turn, I/O subsystem 990 may be coupled to a first link 916 via an interface 996. In one embodiment, first link 916 may be a Peripheral Component Interconnect (PCI) bus, or a bus such as a PCI Express bus or another I/O interconnect bus, although the scope of the present invention is not so limited.

As illustrated in FIG. 9, various I/O devices 914, 924 may be coupled to first link 916, along with a bridge 918 which may couple first link 916 to a second link 920. In one embodiment, second link 920 may be a low pin count (LPC) bus. Various devices may be coupled to second link 920 including, for example, a keyboard/mouse 912, communication device(s) 926 (which may in turn be in communication with the computer network 903), and a data storage unit 928 such as a disk drive or other mass storage device which may include code 930, in one embodiment. The code 930 may include instructions for performing embodiments of one or more of the techniques described above. Further, an audio I/O 924 may be coupled to second bus 920.

Note that other embodiments are contemplated. For example, instead of the point-to-point architecture of FIG. 9, a system may implement a multi-drop bus or another such communication topology. Although links 916 and 920 are illustrated as busses in FIG. 9, any desired type of link may be used. Also, the elements of FIG. 9 may alternatively be partitioned using more or fewer integrated chips than illustrated in FIG. 9.

Figure 10:
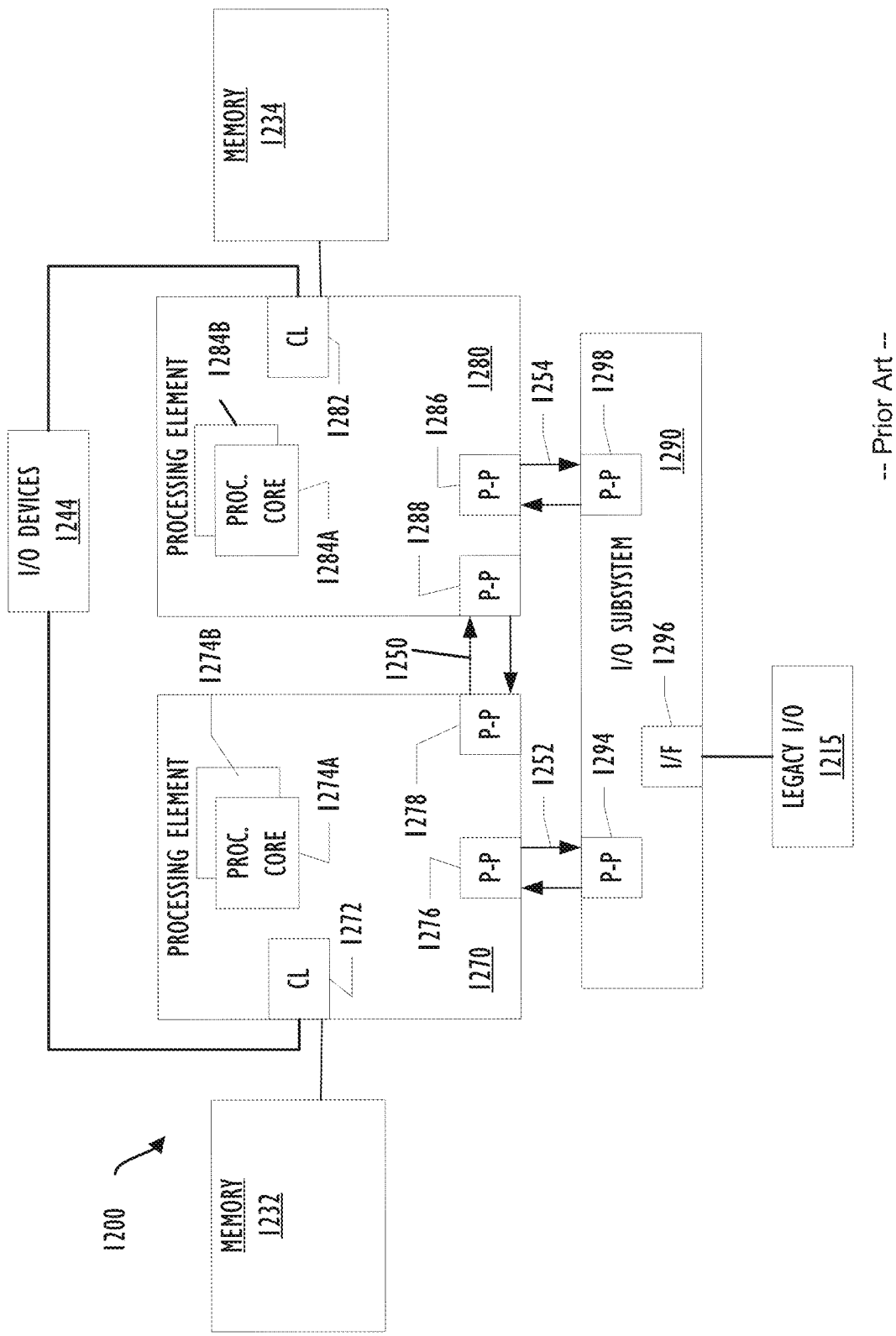
FIG. 10 is a block diagram illustrating a computing device for use with techniques described herein according to another embodiment.

Referring now to FIG. 10, a block diagram illustrates a programmable device 1200 according to another embodiment. Certain aspects of FIG. 9 have been omitted from FIG. 10 in order to avoid obscuring other aspects of FIG. 9.

FIG. 10 illustrates that processing elements 1270 and 1280 may include integrated memory and I/O control logic ("CL") 1272 and 1282, respectively. In some embodiments, the 1272, 1282 may include memory control logic (MC) such as that described above in connection with FIG. 9. In addition, CL 1272, 1282 may also include I/O control logic. FIG. 10 illustrates that not only may the memories 1232, 1234 be coupled to the 1272, 1282, but also that I/O devices 1244 may also be coupled to the control logic 1272, 1282. Legacy I/O devices 1215 may be coupled to the I/O subsystem 1290 by interface 1296. Each processing element 1270, 1280 may include multiple processor cores, illustrated in FIG. 10 as processor cores 1274A, 1274B, 1284A, and 1284B. As illustrated in FIG. 10, I/O subsystem 1290 includes P-P interconnects 1294 and 1298 that connect to P-P interconnects 1276 and 1286 of the processing elements 1270 and 1280 with links 1252 and 1254. Processing elements 1270 and 1280 may also be interconnected by link 1250 and interconnects 1278 and 1288, respectively.

The programmable devices depicted in FIGS. 9 and 10 are schematic illustrations of embodiments of programmable devices which may be utilized to implement various embodiments discussed herein. Various components of the programmable devices depicted in FIGS. 9 and 10 may be combined in a system-on-a-chip (SoC) architecture.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiments will be apparent to those of skill in the art upon reviewing the above description. The scope of the invention should therefore be determined with reference to the appended claims, along with the full scope of equivalents to which such claims are entitled.

What is claimed is:

1. A method for developing a signature for malware identification, comprising:
    identifying a first contiguous string block from malware information stored in a first database, the first contiguous string block including a plurality of component strings;
    assigning a ranking score to the first contiguous string block based on a) a sum of sample counts for each component string of the plurality of component strings in the first contiguous string block and b) a proximity of at least one component string in the first contiguous string block to other component strings in the first contiguous string block;
    responsive to determining that the first contiguous string block meets a predetermined threshold of similarity to a second contiguous string block contained in a second database containing one or more contiguous string blocks extracted from known malware, wildcarding differences between the first contiguous string block and the second contiguous string block contained in the second database to create a wildcarded contiguous string block;
    forming a signature for a malware family, the signature including a plurality of contiguous string blocks, the plurality of contiguous string blocks including the wildcarded contiguous string block; and
    assigning a confidence indicator to the signature, wherein the confidence indicator is based on a count of wildcarded characters found in the signature, a count of strings that are components of the wildcarded contiguous string block, and a block order, and wherein the signature is deployed in a learning mode to update the confidence indicator responsive to a determination that the signature is associated with malware.

2. The method of claim 1, further comprising:
    assigning a second confidence indicator to the wildcarded contiguous string block, the second confidence indicator indicative of confidence in a label applied to the first contiguous string block.

3. The method of claim 2, wherein the second confidence indicator is based at least in part on a number of wildcards in the wildcarded contiguous string block.

4. The method of claim 1, wherein the second contiguous string block is labelled with a first label within the second database and the first contiguous string block is labelled with the first label.

5. The method of claim 1, further comprising:
    in response to determining that the first contiguous string block meets a threshold of dissimilarity with the one or more contiguous string blocks contained in the second database, saving the first contiguous string block to the second database.

6. The method of claim 1, wherein the one or more contiguous string blocks contained in the second database are ranked for use in ordering the one or more contiguous string blocks within the second database.

7. The method of claim 1, further comprising:
    scanning one or more unknown files;
    comparing the one or more unknown files against the first contiguous string block; and
    in response to determining that the first contiguous string block meets a threshold of similarity with the one or more unknown files, treating the one or more unknown files as malware.

8. An apparatus comprising:
    memory;
    instructions in the memory; and
    at least one processor configured to execute the instructions to:
        identify a first contiguous string block from malware information stored in a first database, the first contiguous string block including a plurality of component strings;
        assign a ranking score to the first contiguous string block based on a) a sum of sample counts for each component string of the plurality of component strings in the first contiguous string block and b) a proximity of at least one component string in the first contiguous string block to other component strings in the first contiguous string block;

responsive to determining that the first contiguous string block meets a predetermined threshold of similarity to a second contiguous string block contained in a second database containing one or more contiguous string blocks extracted from known malware, wildcard differences between the first contiguous string block and the second contiguous string block contained in the second database to create a wildcarded contiguous string block;

form a signature for a malware family, the signature including a plurality of contiguous string blocks, the plurality of contiguous string blocks including the wildcarded contiguous string block; and assign a confidence indicator to the signature, wherein the confidence indicator is based on a count of wildcarded characters found in the signature, a count of strings that are components of the wildcarded contiguous string block, and a block order, and wherein the signature is deployed in a learning mode to update the confidence indicator responsive to a determination that the signature is associated with malware.

9. The apparatus of claim 8, wherein the at least one processor is further configured to execute the instructions to assign a second confidence indicator to the wildcarded contiguous string block, the second confidence indicator indicative of confidence in a label applied to the first contiguous string block.

10. The apparatus of claim 9, wherein the second confidence indicator is based at least in part on a number of wildcards in the wildcarded contiguous string block.

11. The apparatus of claim 8, wherein the second contiguous string block is labelled with a first label within the second database and the first contiguous string block is labelled with the first label.

12. The apparatus of claim 8, wherein the at least one processor is further configured to execute the instructions to, in response to determining that the first contiguous string block meets a threshold of dissimilarity with the one or more contiguous string blocks contained in the second database, save the first contiguous string block to the second database.

13. The apparatus of claim 8, wherein the one or more contiguous string blocks contained in the second database are ranked for use in ordering the one or more contiguous string blocks within the second database.

14. The apparatus of claim 8, wherein the at least one processor is further configured to execute the instructions to:
scan one or more unknown files;
compare the one or more unknown files against the first contiguous string block; and
in response to determining that the first contiguous string block meets a threshold of similarity with the one or more unknown files, treat the one or more unknown files as malware.

15. A non-transitory computer readable medium comprising instructions which, when executed by processor circuitry, configure the processor circuitry to:

identify a first contiguous string block from malware information stored in a first database, the first contiguous string block including a plurality of component strings;

assign a ranking score to the first contiguous string block based on a) a sum of sample counts for each component string of the plurality of component strings in the first contiguous string block and b) a proximity of at least one component string in the first contiguous string block to other component strings in the first contiguous string block;

responsive to determining that the first contiguous string block meets a predetermined threshold of similarity to a second contiguous string block contained in a second database containing one or more contiguous string blocks extracted from known malware, wildcard differences between the first contiguous string block and the second contiguous string block contained in the second database to create a wildcarded contiguous string block;

form a signature for a malware family, the signature including a plurality of contiguous string blocks, the plurality of contiguous string blocks including the wildcarded contiguous string block; and assign a confidence indicator to the signature, wherein the confidence indicator is based on a count of wildcarded characters found in the signature, a count of strings that are components of the wildcarded contiguous string block, and a block order, and wherein the signature is deployed in a learning mode to update the confidence indicator responsive to a determination that the signature is associated with malware.

16. The non-transitory computer readable medium of claim 15, wherein the instructions, when executed, further configure the processor circuitry to assign a second confidence indicator to the wildcarded contiguous string block, the second confidence indicator indicative of confidence in a label applied to the first contiguous string block.

17. The non-transitory computer readable medium of claim 16, wherein the second confidence indicator is based at least in part on a number of wildcards in the wildcarded contiguous string block.

18. The non-transitory computer readable medium of claim 15, wherein the second contiguous string block is labelled with a first label within the second database and the first contiguous string block is labelled with the first label.

19. The non-transitory computer readable medium of claim 15, wherein the instructions, when executed, further configure the processor circuitry to, in response to determining that the first contiguous string block meets a threshold of dissimilarity with the one or more contiguous string blocks contained in the second database, save the first contiguous string block to the second database.

20. The non-transitory computer readable medium of claim 15, wherein the one or more contiguous string blocks contained in the second database are ranked for use in ordering the one or more contiguous string blocks within the second database.

* * * * *